Sept. 28, 1965  F. S. ALLINQUANT  3,208,474
DOUBLE-ACTING VALVES, APPLICABLE IN PARTICULAR
TO SINGLE-VALVE TELESCOPIC DAMPERS
Filed Jan. 15, 1964  2 Sheets-Sheet 1
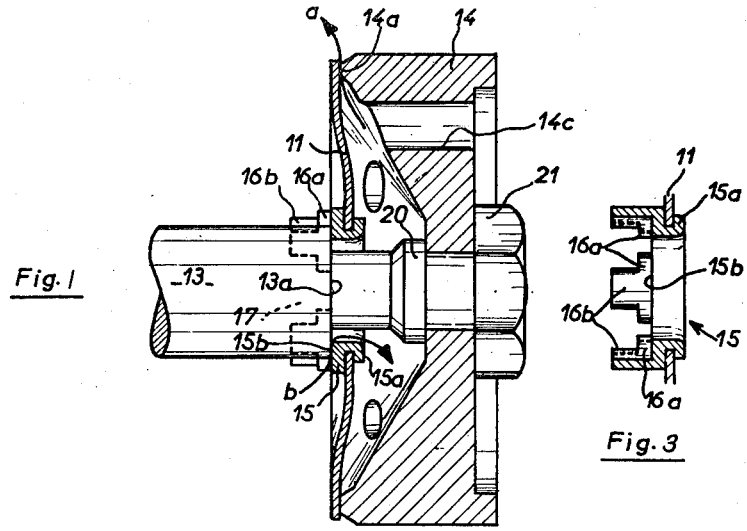
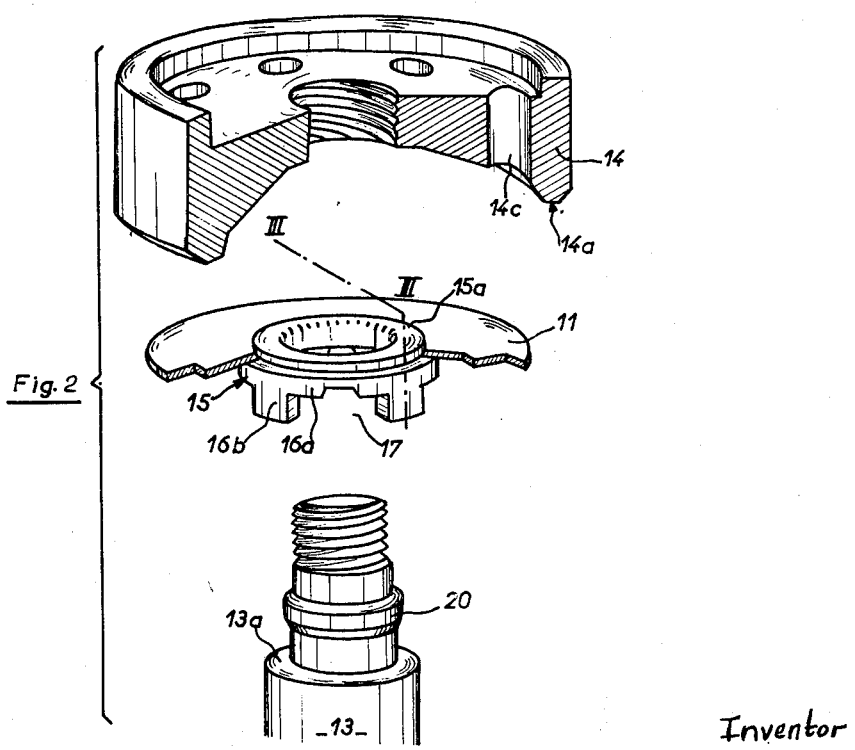
Inventor
Fernand Stanislas Allinquant
By Stevens, Davis, Miller & Mosher
Attorneys Inventor
Fernand Stanislas Allinquant
By Stevens, Davis, Miller & Mosher
Attorneys United States Patent Office 3,208,474
Patented Sept. 28, 1965

3,208,474
DOUBLE-ACTING VALVES, APPLICABLE IN PARTICULAR TO SINGLE-VALVE TELESCOPIC DAMPERS
Fernand Stanislas Allinquant, 53 Avenue le Notre, Sceaux, France
Filed Jan. 15, 1964, Ser. No. 337,907
Claims priority, application France, Jan. 19, 1963, 921,983; May 7, 1963, 934,000; Nov. 5, 1963, 952,780
9 Claims. (Cl. 137—493.9)

It has been suggested that a dual purpose valve, the moving part of which (that is, the valve proper) consists of one or more washers of elastic foil, be used with telescopic shock absorbers. The washers have a central opening and cooperate with two substantially planar valve seats located opposite one another. These seats are bounded by edges respectively less than the outer diameter and greater than the inner diameter of the one or more washers comprising the valve proper. The movement of the washer or washers in these shock absorbers is generally assured by a rod which occupies the central bore without appreciable diametrical play and which has longitudinal grooves which allow the shock absorber fluid to flow in a direction which corresponds to a central raising (movement) of the valve.

Tests have shown that it is difficult to obtain at the same time the two contradictary objectives of both a central passage of adequate cross section and an accurate and durable movement for the washer or washers. As a rule, a hard metal washer will mark the valve seats of the rod and the function of the valve is thus impaired after some time.

An object of the present invention is a dual purpose valve that solves this contradiction.

A further object of the present invention is a dual purpose valve that substantially reduces the wear and tear customarily resulting from hammering of the valve seat from rubbing against the guide surfaces by the valve proper.

When valves devised as hereinbefore described are incorporated in a hydraulic damper, the central valve seat cooperating with the elastic washer, which may or may not be rigidly connected with the spacer, is generally formed by a shoulder on the end of a rod having threaded thereon the valve proper and fixed thereto a piston provided with axial passages and constituting the peripheral valve seat. The central bearing surface is in this case naturally directed towards the end of the rod and the damper develops its maximum force in that direction of flow of the liquid which corresponds to a central lifting motion of the valve and extension of the damper.

For special applications however, such as, for instance, when the damper associated to an automobile wheel is connected thereto through a beam-lever, it may be desirable to devise a telescopic damper having a preponderant cross-section operative on retraction, in contrast to the more general case wherein the main damping force is exerted on extension of the damper. This can be done by reversing the valve seat with which the valve cooperates, as well as also the manner of assembly of the valve on the rod used to assemble the various component parts thereof. In this second embodiment, the central valve seat is directed inwardly of the rod and the piston fitted before the valve proper and the central valve seat.

This alternative embodiment is likewise characterized by a particularly simple form of design of the end of the rod supporting the damper piston and also by the manner of securing to said rod the piston and the guide constituting the central valve seat of the valve.

Lastly, though subsidiarily, as is well known per se, the peripheral bearing surface of the valve may comprise, immediately beneath the foil washer with which it cooperates, unobstructed passageways providing a small transfer flow through the valve without any lift thereof.

A double-acting valve as described hereinabove offers several advantages in addition to its simplicity of manufacture. Firstly, such a valve is able to rotate about itself and to deform axially despite the fact that it is guided and functions in perfectly symmetrical fashion. Secondly, the usual metallic foil constituting the valve operates uniformly and is free from such local stresses as may be associated, say, with a form of guidance resorting to the insertion thereinto of at least one tongue formed in the valve. (Such insertion is in point of fact difficult to obtain with narrow manufacturing tolerances in quantity production.) Thirdly and most importantly, its passageway cross-section is restricted by the valve guide surfaces, which means that when the valve is only slightly open the amount of lift must be sufficient to make the effect of viscosity negligible. Said passageway section will in fact be established at the outset solely by the cross-section offered by the notches in the spacer, which cross-section can be rendered variable as a function of the valve stroke.

The description which follows with reference to the accompanying non-limitative exemplary drawings will give a clear understanding of the various features of the invention and of the manner of carrying them into effect.

Referring to the drawings filed herewith:

FIGURE 1 shows schematically in longitudinal section a double-acting valve according to the invention.

FIGURE 2 is an exploded view of a similar device, showing a simplified form of attachment of the damper piston to its rod.

FIGURE 3 is a fragmental section taken through the line III—III of FIGURE 2.

Figure 4:
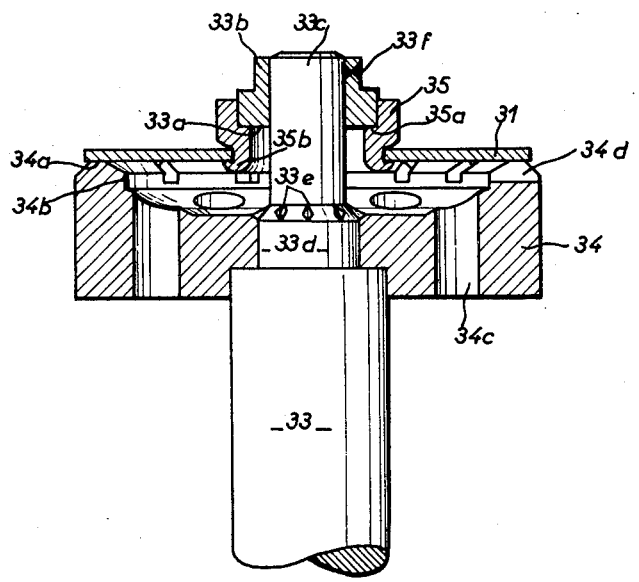
FIGURE 4 shows in longitudinal section an alternative form of construction of a double-acting valve, wherein the assembly mode is reversed.

Reference to FIGURES 1 to 3 shows a first alternative embodiment comprising a double-acting valve which cooperates axially with a central valve seat 13a on a rod 13 and with a peripheral surface 14a on a piston 14 fixed to the extremity of said rod and drilled with passageways 14c parallel with the axis of the damper. A shoulder 20 of smaller diameter than that of rod 13 and of relatively small radial dimenison is used to secure piston 14 to its rod, in conjunction with a nut 21, thereby enabling the rod shoulder 20 to form a more or less deep imprint in a piston 14 made of softer material, whereby the mutual axial positions of the oppositely disposed surfaces 13a and 14a can be adjusted. The piston 14 can be screwed directly onto rod 13, as shown in FIGURE 2.

The valve proper consists merely of a circular washer 11 made of elastic foil of appropriate thickness, the central portion of which is rigid with a spacer 15 embodying an axial bore whose diameter is less than that of rod 13 but at least equal to that of shoulder 20. The elastic foil may obviously be doubled or provided with circular ribs whereby to increase its flexibility, while its thickness may vary radially. The said spacer is simply riveted in the central bore of foil 11, via a folded edge 15a. It has a flat surface 15b which cooperates with the surface 13a of rod 13, and cylindrical walls 16a, 16b which surround said rod with a small clearance. Said walls are interrupted circumferentially whereby to form discrete elements with intervening notches 17, which notches are in addition stepped, the portions 16a of said elements occupying arcs greater than those occupied by the portions 16b.

The axial depth of the latter portions is greater than the maximum central lift of the valve, whereby the same is unfailingly guided radially by cooperation of rod 13 with walls 16a, 16b. The axial depth of that portion of the spacer which extends from the bearing surface 15b thereof to the folded edge 15a is manifestly less than the distance between the surface 13a and the shoulder 20 of rod 13.

The piston 14 shown in FIGURE 2 is screwed directly onto the end of rod 13, thereby further simplifying the device.

A double-acting valve according to the invention operates in absolutely conventional fashion in the direction of flow a corresponding to lifting of the valve periphery.

In the opposite direction b, corresponding to lifting of the central valve portion, it can be clearly seen that the fluid passageway has a section formed by arcs of the central valve seat 13a, and the associated wall portions 16a, 16b defining a notch 17. The contour shape of the cylindrical walls 16a, 16b and of the gaps 17 bounded by the same may be adjusted whereby to modify not only the mathematical relation between the rate of fluid flow in the direction b and the degree of central valve lift, but more specifically the rate of increase of this relation. Recourse to very simple means thus makes it easy to ensure that the fluid passageway section varies as a function of the degree of lift in a predetermined fashion (linearly, parabolically, etc.). The degree of lift will be all the greater as the arcs over which the gaps 17 extend are smaller, and will at all events be greater than in the case of a valve in which the foil 11 is utilized without a spacer and with a fluid passageway extending over the full circumference of the central bore in said foil. This results in the flow rapidly becoming turbulent and the geometry of the fluid passageway section being made more precise.

Figure 5:
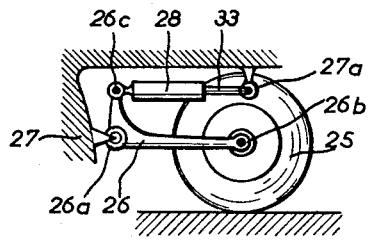
FIGURE 5 is a diagrammatic illustration of a possible method of mounting a hydraulic telescopic damper equipped with such a valve.

Referring now to FIGURE 5, there is shown thereon a wheel 25 mounted on a swinging suspension arm 26 pivotally connected at 26a to the chassis or body 27 of a vehicle whose suspension springs are not shown for greater clarity. The arm 26 is provided with a pivotal connection point 26c for a telescopic damper 28 whose opposite end is pivotally connected to the chassis at 27a. The damping force as the wheel drops, which is greater than the force exerted as the wheel rises (in accordance with a practice well known to the specialist in the art), in this instance takes place when the damper is retracted, i.e., when the articulation points 26c and 27a are moving towards each other, which assists leaktightness about the damper rod.

FIGURE 4 shows on an enlarged scale a damper piston devised to permit easy obtainment of such unequal action.

Both the valve proper, consisting of a circular piece of foil 31 provided with a central bore into which may be crimped at 35b a spacer 35 fulfilling the function of a distributor, and the piston 34, drilled with passages 34c and providing a peripheral valve seat 34a for said foil, are similar to those hereinbefore described with reference to the first constructive form of the invention, except that in this alternative embodiment they are fitted in the reverse position, whereby the valve lift that takes place towards the rod is no longer the peripheral lift but the central lift.

Such a form of assembly can be effected for instance by providing the end of rod 33 with two coaxial cylindrical portions of stepped diameters, of which the larger (33d) receives the piston 34, and the smaller (33c), at the tip of the rod, is in rigid connection with a cylindrical guide 33b. Said guide constitutes the central valve seat 33a of the valve and is fitted over the portion 33c, then electrically spot-welded at 33f. It will be manifest that guide 33b could be screwed in position if desired, although this would be more costly. Piston 34 is likewise rigidly connected to the portion 33d by notches, as at 33e, or in any other suitable way, known per se.

Bleed passageways 34d may be provided beneath the foil 31, in the manner well known per se, whereby to permit fluid flow in the absence of valve lift.

The manner of operation of the valve just described differs only in that the greater force, i.e. the damping force, is exerted in the opposite direction.

It goes without saying that many modifications and substitutions of parts may be made to the embodiments of the double-acting valve hereinbefore described, without departing from the spirit and scope of the invention. By way of example, the spacer could be disposed about the valve proper instead of in the central bore thereof.

What is claimed is:

1. A double acting valve for fluid pressure relief control, comprising:
    an elastic valve member having a first central opening and first and second faces;
    a spacer means rigidly connected to said valve member and associated therewith in the vicinity of said first central opening and having a second central opening interior of said first opening; an annular seat; and spaced cylindrical guide wall means, whereby said spacer means acts to guide said valve member;
    an at least partly cylindrical rod defining a first direction and passing through said second opening, whereby said rod cannot be contacted by said valve member, the cylindrical portion of the rod cooperating with said spaced cylindrical guide wall means and the spaces between said guide wall means permitting fluid flow during central lift of the valve member;
    a valve seat associated with said rod opposite said first face of the valve member and cooperating with said annular seat;
    a piston rigid with said rod and having passageways for admitting fluid to either side thereof; and
    an annular peripheral valve seat forming part of said piston and located opposite said second face of the valve member.

2. The double-acting valve of claim 1, wherein the spacing of spaced cylindrical guide walls varies in said first direction.

3. The double-acting valve of claim 2, wherein said spacing so varies that the rate of the central lift of the valve member is highest at the beginning of the lifting.

4. The double-acting valve of claim 1, wherein said spacer means is located between said valve seat and said piston.

5. The double-acting valve of claim 4, wherein said piston is rigid with one end of said rod.

6. The double-acting valve of claim 4, wherein said valve seat is formed by a cylindrical guide means rigid with one end of said rod.

7. The double-acting valve of claim 6, wherein said guide means is coaxial with and surrounds said rod.

8. The double-acting valve of claim 1, wherein said annular peripheral valve seat includes bleed passages.

9. The double-acting valve of claim 1, wherein said spacer means forms a collar for said valve member at the first central opening.

References Cited by the Examiner

UNITED STATES PATENTS

| 2,214,364 | 9/40 | Edwards | 137—493 |
| 2,521,202 | 9/50 | Cloudsley | 188—88.503 XR |
| 3,124,488 | 3/64 | Ruetschi | 137—493.9 XR |

FOREIGN PATENTS

| 1,065,526 | 5/54 | France. |

M. CARY NELSON, *Primary Examiner.*

MARTIN P. SCHWADRON, *Examiner.*